United States Patent [19]

Higashiguchi et al.

[11] Patent Number: 4,480,019
[45] Date of Patent: Oct. 30, 1984

[54] ELECTROPHOTOGRAPHIC PHOTOSENSITIVE MATERIAL

[75] Inventors: Teruaki Higashiguchi, Tokyo; Kaname Nakatani, Kawasaki; Nobuhiro Miyakawa, Abiko, all of Japan

[73] Assignee: Mita Industrial Co., Ltd., Osaka, Japan

[21] Appl. No.: 484,262

[22] Filed: Apr. 12, 1983

[30] Foreign Application Priority Data

Apr. 13, 1982 [JP] Japan ................... 57-60312

[51] Int. Cl.³ .................. G03G 5/02; G03G 5/05; G03G 5/06
[52] U.S. Cl. .................. 430/58; 430/57; 430/70; 430/75; 430/76; 430/78
[58] Field of Search ............... 430/57, 58, 70, 72, 430/75, 76, 78

[56] References Cited

U.S. PATENT DOCUMENTS 3,898,084  8/1975  Champ et al. ................ 96/1.5
4,123,270 10/1978  Heil et al. ................... 96/1.5 R

FOREIGN PATENT DOCUMENTS 58-44443  3/1983  Japan .

Primary Examiner—Mary F. Downey
Attorney, Agent, or Firm—Sherman & Shalloway

[57] ABSTRACT

Disclosed is a photosensitive material for electrophotography, which comprises a photosensitive layer containing a disazo pigment represented by the following formula:

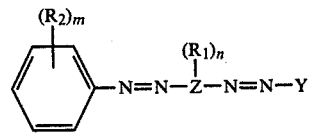

wherein $R_1$ stands for a lower alkyl group or a lower alkoxy group, n is a number of zero, 1 or 2, $R_2$ stands for a lower alkyl group, a lower alkoxy group, a di-lower-alkylamino group, a nitro group or a halogen atom, m is a number of zero, 1 or 2, Z stands for a benzene ring or a naphthalene ring, and Y stands for a group represented by the following formula:

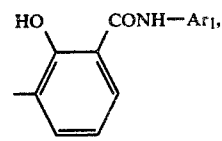

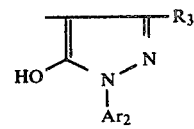

or

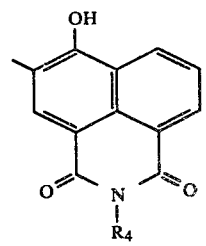

in which B stands for a benzene, naphthalene, indole, carbazole or benzofuran ring or a substitution product thereof, which is fused to the benzene ring, $Ar_1$ and $Ar_2$ stand for a benzene ring, a naphthalene ring, a dibenzofuran ring or a substitution product thereof, $R_3$ stands for a lower alkyl group, a carboxyl group or a carboxyl ester group, and $R_4$ stands for a hydrogen atom, a lower alkyl group, a phenyl group or a substituted phenyl group.

23 Claims, 1 Drawing Figure

ELECTROPHOTOGRAPHIC PHOTOSENSITIVE MATERIAL

BACKGROUND OF THE INVENTION (1) Field of the Invention

The present invention relates to an electrophotographic photosensitive material containing a disazo pigment in a photosensitive layer.

(2) Description of the Prior Art

It has been known from old that a disazo pigment is valuable as a photoconductive substance for an electrophotographic photosensitive material (see, for example, Japanese Laid-Open Patent Application Specification No. 37453/72). However, in the field of the electrophotography, it is always required to expand the sensitive wavelength region of a photosensitive material and increase the sensitivity thereof, and recently, development of a photoconductive pigment having an excellent sensitivity to laser beams is especially desired.

SUMMARY OF THE INVENTION

We found that a specific disazo pigment described below has an excellent sensitivity in a broad wavelength region and is especially valuable as an organic photoconductive pigment having a sensitivity to laser beams.

In accordance with the present invention, there is provided a photosensitive material for electrophotography, which comprises a photosensitive layer containing a disazo pigment represented by the following formula:

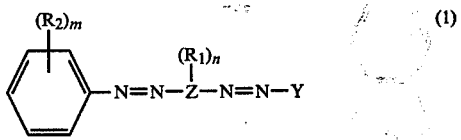
(1)

wherein $R_1$ stands for a lower alkyl group or a lower alkoxy group, n is a number of zero, 1 or 2, $R_2$ stands for a lower alkyl group, a lower alkoxy group, a di-lower-alkylamino group, a nitro group or a halogen atom, m is a number of zero, 1 or 2, Z stands for a benzene ring or a naphthalene ring, and Y stands for a group represented by the following formula:

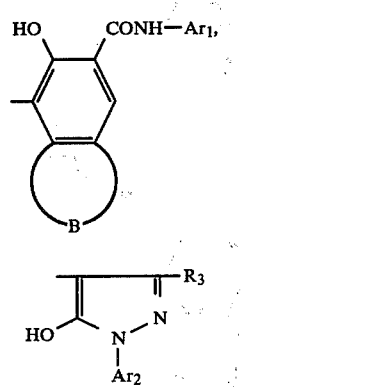

or

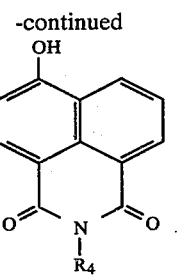

in which B stands for a benzene, naphthalene, indole, carbazole or benzofuran ring or a substitution product thereof, which is fused to the benzene ring, $Ar_1$ and $Ar_2$ stand for a benzene ring, a naphthalene ring, a dibenzofuran ring or a substitution product thereof, $R_3$ stands for a lower alkyl group, a carboxyl group or a carboxyl ester group, and $R_4$ stands for a hydrogen atom, a lower alkyl group, a phenyl group or a substituted phenyl group.

Incidentally, by the term "lower" used in the specification and appended claims is meant "having up to 4 carbon atoms".

DETAILED DESCRIPTION OF THE INVENTION

Figure 1:
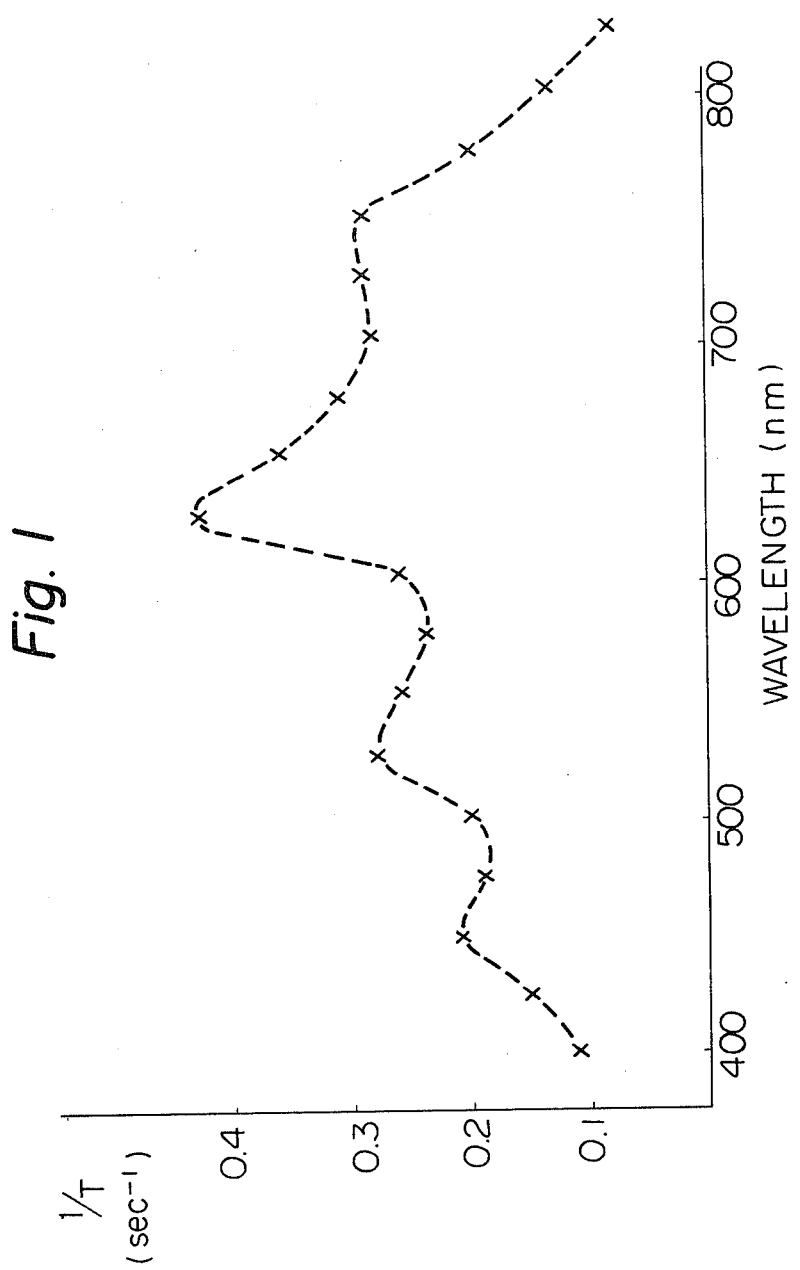
FIG. 1 is a spectral sensitivity curve of a photosensitive material comprising a disazo pigment No. 1 obtained in Synthesis Example.

The disazo pigment used in the present invention has a structure obtained by coupling a diazonium salt represented by the following formula:

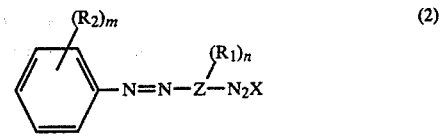
(2)

wherein Z, $R_1$, $R_2$, n and m are as defined above, and X stands for an anion, with an azo coupling component represented by the following formula:

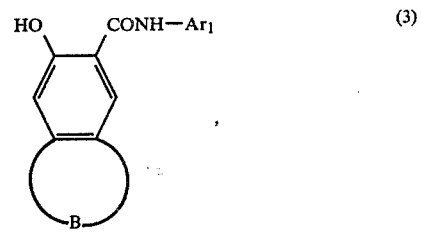
(3)

or

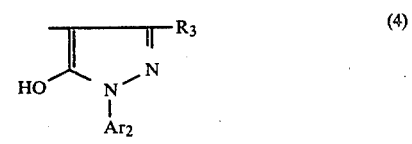
(4)

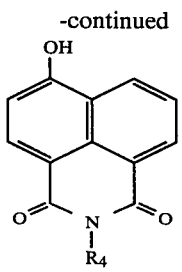

(5)

wherein B, Ar₁, Ar₂, R₃ and R₄ are as defined above.

A photosensitive material containing the disazo pigment used in the present invention, for example, a photosensitive material of Example 1 containing a disazo pigment No. 1 obtained in Synthesis Example given hereinafter, has an excellent sensitivity over a broad wavelength region of 400 to 800 nm and an especially high sensitivity to an He-Ne laser beam oscillation wavelength of 632.8 nm, as is seen from the spectral sensitivity curve of FIG. 1. By dint of this characteristic feature, a photosensitive material containing this disazo pigment in a photosensitive layer is valuable not only as a photosensitive material for ordinary electrophotographic reproduction or printing but also as a photosensitive material to be used for a laser printer. Moreover, this disazo pigment is excellent in the stability and fastness to attacks of beams, discharge and ozone. Therefore, a photosensitive material excellent in the printing resistance can be provided according to the present invention.

Each of the above-mentioned diazonium salt and azo coupling component is a known compound. Preferred examples of the diazonium salt are compounds described below, though diazonium salts that can be used are not limited to the compounds described below.

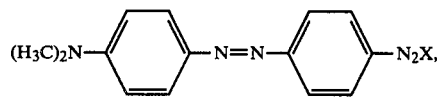

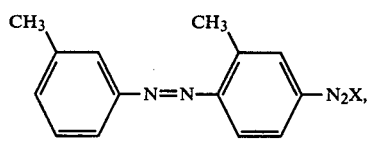

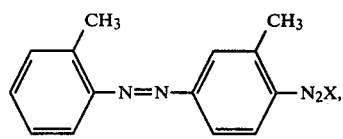

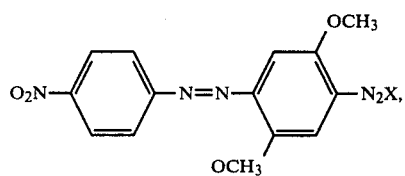

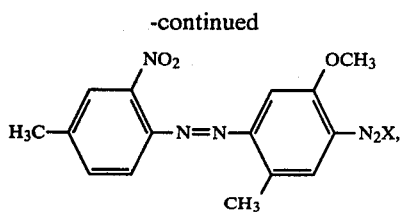

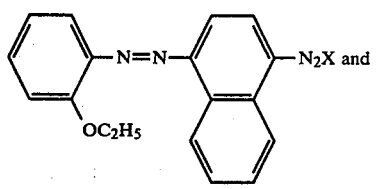

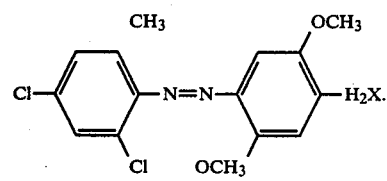

Preferred examples of the azo coupling component are compounds described below.

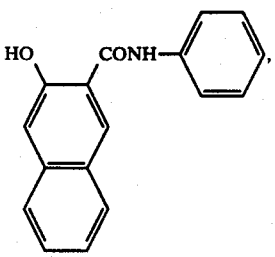

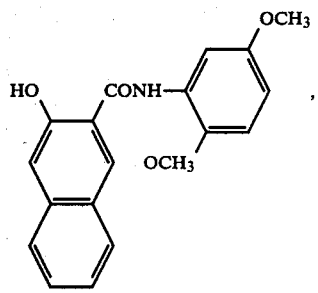

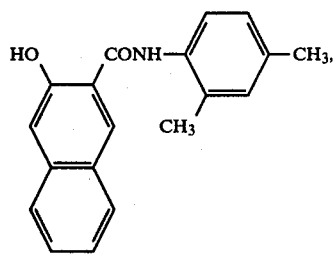

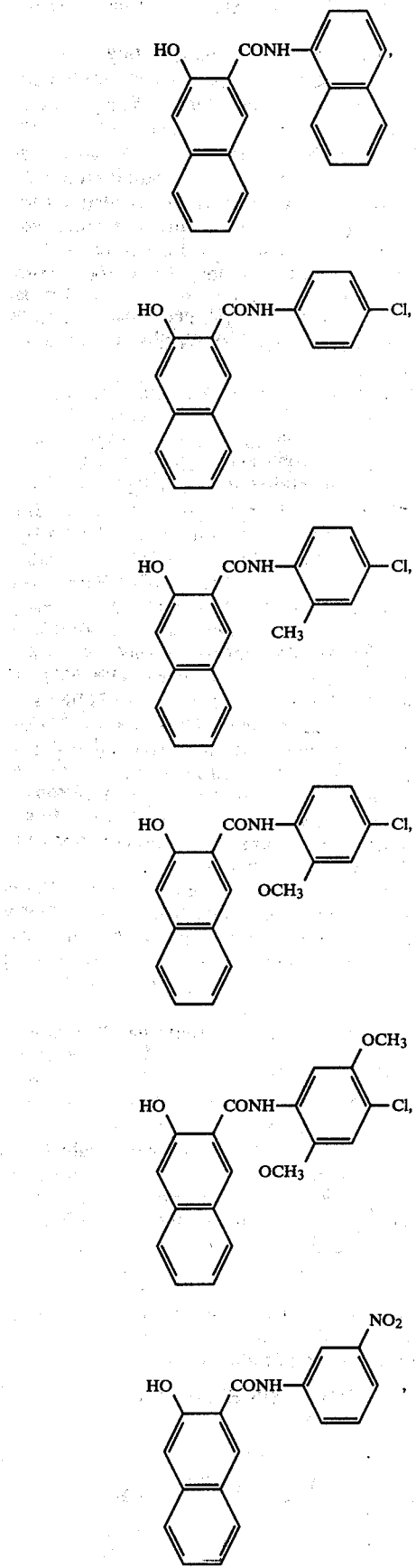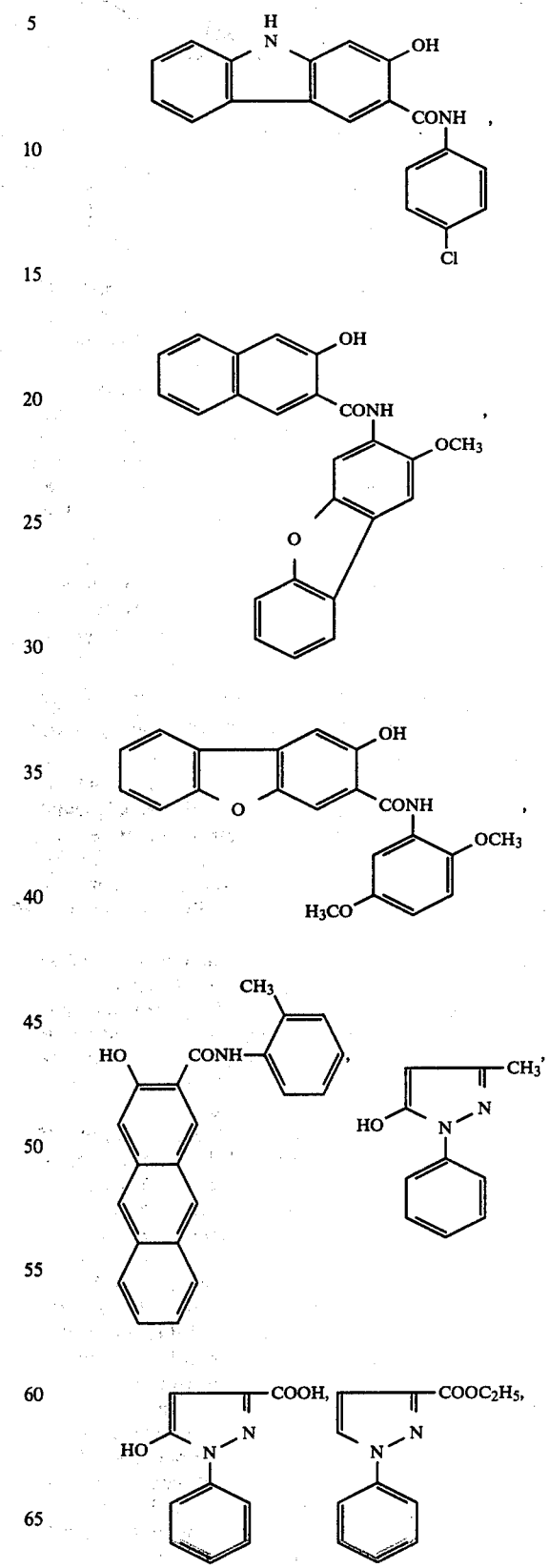

-continued

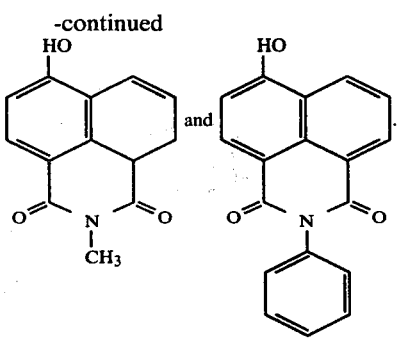

In the electrophotographic photosensitive material according to the present invention, the disazo pigment may be used in various modes, so long as the disazo pigment is contained in the photosensitive layer.

For example, the disazo pigment is dispersed as a photoconductive pigment in an electrically insulating binder medium and the resulting composition is applied to an electroconductive substrate to form a photoconductive layer. In this embodiment, it is preferred that the disazo pigment be dispersed so finely that the particle size of the pigment is smaller than 3 microns, especially smaller than 1 micron. In this embodiment, as the electrically insulating binder medium, there are used a polyester resin, an acrylic resin, a styrene resin, an epoxy resin, a polycarbonate resin, a silicone resin, an alkyd resin and a vinyl chloride-vinyl acetate copolymer.

It is preferred that the disazo pigment be used in an amount of 5 to 100 parts by weight, especially 10 to 80 parts by weight, per 100 parts by weight of the binder.

A metal substrate in the form of a sheet or drum or a paper which has been subjected to an electrically conductive treatment is used as the electroconductive substrate, and it is preferred that the amount coated of the photoconductive layer formed on the electroconductive substrate be 3 to 20 g/m$^2$, especially 5 to 10 g/m$^2$, on the dry basis.

In accordance with another embodiment of the present invention, the disazo pigment is dispersed as a charge-generating pigment in a charge-transporting substance and the resulting dispersion is applied to an electroconductive substrate to form a photosensitive layer. A known hole-transporting substance or an electron-transporting substance is used as the chargetransporting substance for attaining the object of the present invention. As preferred examples of the hole-transporting substance, there can be mentioned poly-N-vinylcarbazole, phenanthrene, N-ethylcarbazole, 2,5-diphenyl-1,3,4-oxadiazole, 2,5-bis-(4-diethylaminophenyl)-1,3,4-oxadiazole, bis-diethylaminophenyl-1,3,6-oxadiazole, 4,4'-bis-(diethylamino-2,2'-dimethyltriphenyl)methane, 2,4,5-triaminophenylimidazole, 2,7-bis-(4-diethylaminophenyl)-1,3,4-triazole, 1-phenyl-3-(4-diethylaminostyryl)-5-(4-diethylaminophenyl)-2-pyrazoline and p-diethylaminobenzaldehydo-(diphenylhydrazone). As preferred examples of the electron-transporting substance, there can be mentioned 2-nitro-9-fluorenone, 2,7-dinitro-9-fluorenone, 2,4,7-trinitro-9-fluorenone, 2,4,5,7-tetranitro-9-fluorenone, 2-nitrobenzothiophene, 2,4,8-trinitrothioxanthone, dinitroanthracene, dinitroacridine, dinitroanthraquinone and tetracyanoquinodimethane. Of course, these substances may be used singly or in the form of a mixture of two or more of them. Furthermore, a complex comprising an electron acceptor and an electron donor may be used as the charge-transporting substance so that both of holes and electrons can be transported.

In the case where the charge-transporting substance is a low-molecular-weight substance, it is necessary that the charge-transporting substance should be used in the state where it is dispersed in a binder resin such as mentioned above. If the charge-transporting substance is a highly polymeric substance having a binding property, in order to reinforce the mechanical properties and improve the adhesion to the substrate, it is preferred that a binder resin such as mentioned above be used.

In this embodiment, it is preferred that the disazo pigment as the charge-generating agent be used in an amount of 1 to 30 parts by weight, particularly 2 to 20 parts by weight, per 100 parts by weight of the entire photosensitive layer.

In accordance with still another embodiment of the present invention, a charge-generating layer containing the above-mentioned disazo pigment is formed on an electroconductive substrate and a charge-transporting layer is formed on the charge-generating layer. The charge-generating layer may be formed by vacuum deposition of the disazo pigment on the substrate or by coating a dispersion of the disazo pigment in an organic solvent on the substrate and drying the dispersion. Furthermore, as in the first embodiment, the charge-generating layer may be formed by coating a dispersion of the disazo pigment in a binder resin on an electroconductive substrate. Moreover, the charge-transporting layer can easily be formed by coating a charge-transporting substance as mentioned above with reference to the second embodiment. The thickness of the charge-generating layer may be changed in the range of from 0.1 micron in case of vacuum deposition of 3 microns in case of the resin-pigment dispersion, and it is preferred that the thickness of the charge-transporting layer be in the range of from 5 to 30 microns.

The disazo pigment used in the present invention has an especially excellent sensitivity when it is used for a photosensitive layer of the third type, that is, a function-separated type photosensitive layer comprising a charge-generating layer and a charge-transporting layer.

The electrophotographic photosensitive material according to the present invention is used for the electrophotographic process in which the photosensitive layer is subjected to positive or negative corona discharge to charge the surface of the photosensitive layer and the charged surface of the photosensitive layer is subjected to imagewise light exposure to form an electrostatic latent image. Among the above-mentioned electrophotographic photosensitive materials, those of the first and second types are advantageously used when positive charging is effected, and that of the third type is advantageously used when negative charging is effected.

The present invention will now be described in detail with reference to the following Examples that by no means limit the scope of the invention.

SYNTHESIS EXAMPLE

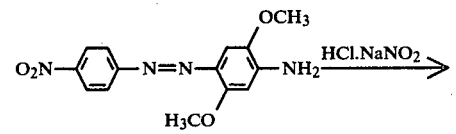

-continued

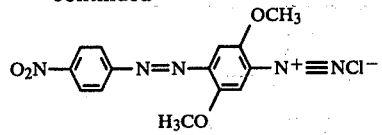

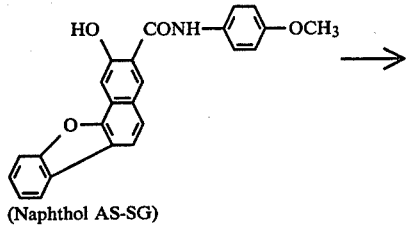

(Naphthol AS-SG)

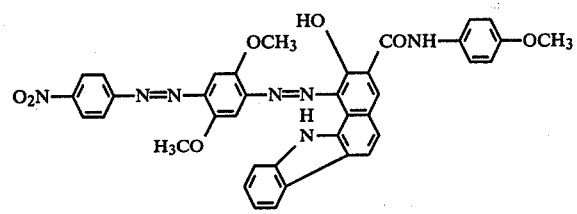

(Pigment No. 1)

In the above reaction formula, 3.02 g (0.01 mole) of 4'-nitro-4-amino-2,5-dimethoxyazobenzene was dissolved with stirring in 50 ml of 18N hydrochloric acid, and the solution was cooled to 5° to 10° C. and 4.5 ml of a 5N aqueous solution of NaNO$_2$ was added thereto to effect diazotization. The reaction was carried out for 1 hour, and the reaction mixture was filtered and zinc chloride and sodium chloride were added to the filtrate to precipitate a diazonium salt, which was then recovered by filtration.

In 100 ml of N,N-dimethylformamide was dissolved 4.01 g (0.0105 mole) of Naphthol AS-SG, and 50 ml of an aqueous solution containing 5 mole/l of sodium acetate was added to the above solution to form a coupling agent solution. The coupling agent solution was cooled to 10° to 20° C.

The above-mentioned diazonium salt was dissolved in a mixture of 50 ml of N,N-dimethylformamide and 50 ml of water, and the solution was gradually added to the coupling agent solution to effect coupling reaction. After completion of the coupling reaction, the reaction mixture was allowed to stand still for a while, and dilute hydrochloric acid was added to the reaction mixture to render it weakly acidic (pH value of about 3 to about 4) and the mixture was heated. The pigment crystal was recovered by filtration, washed with water, acetone and ethanol and dried in vacuo to obtain 5.75 g of a bluish black pigment.

Yield: 5.75 g (84.2% of the theoretical value)
Appearance: bluish black, crystalline
Melting Point: 351° C.

| IR Spectrum: | | |
|---|---|---|
| 1660 cm$^{-1}$ | $\nu C = O$ | —CONH— |
| 1540 cm$^{-1}$ | $\delta NH$ | |
| 1525 cm$^{-1}$ | $\nu$-NO$_2$ | —C$_6$H$_4$—NO$_2$ |
| 1330 cm$^{-1}$ | | |

Visible Spectrum: $\lambda$max 640 nm (in tetrahydrofuran)
Elementary Analysis Values: calculated: C=65.61%, H=4.17%, O=16.12%, N=14.10%; found: C=65.78%, H=3.98%, O=16.23%, N=14.01%

Disazo pigments synthesized according to methods similar to the method described in the Synthesis Example are shown in Table 1.

TABLE 1

No. 2

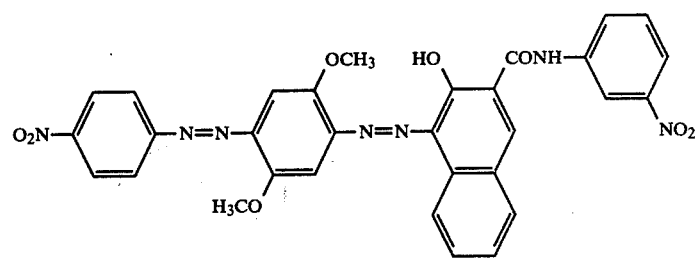

No. 3

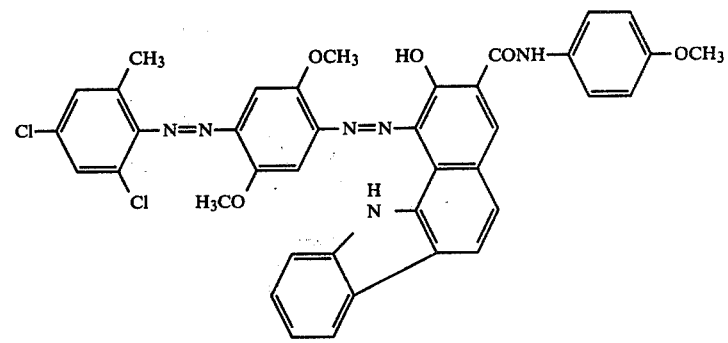

TABLE 1-continued
No. 4
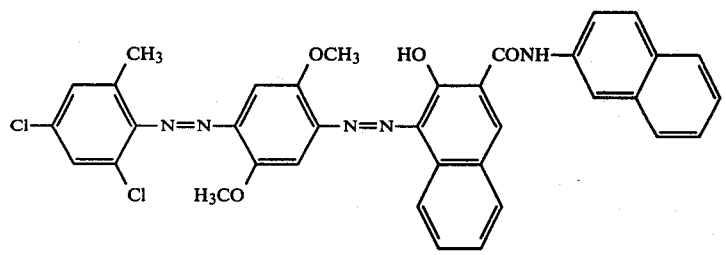
No. 5
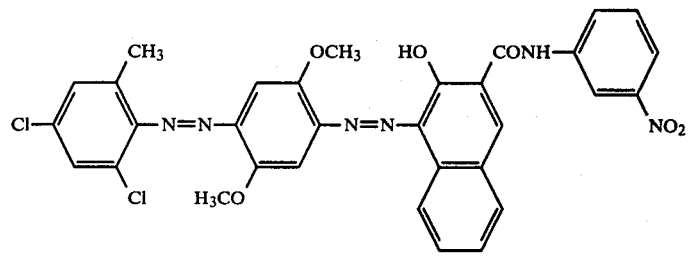
No. 6
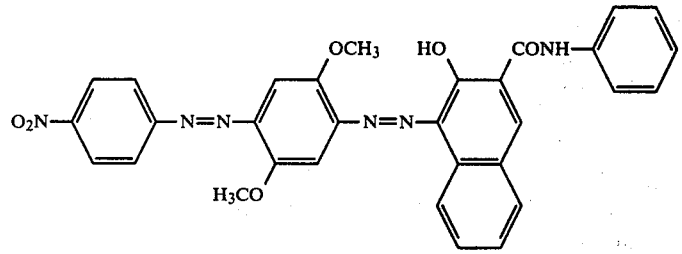
No. 7
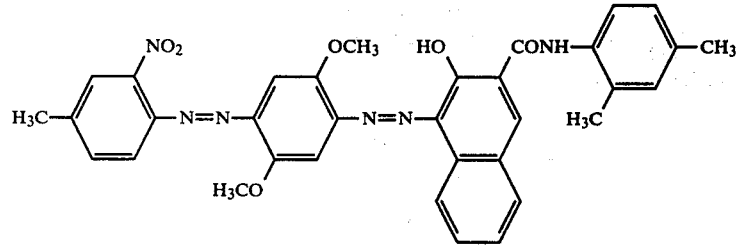
No. 8
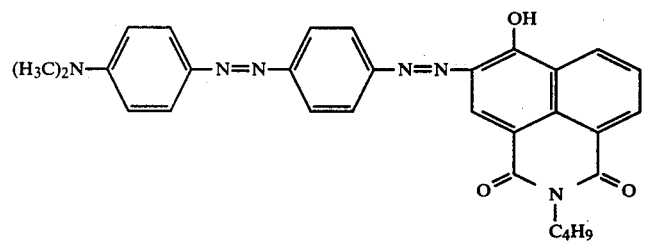
No. 9
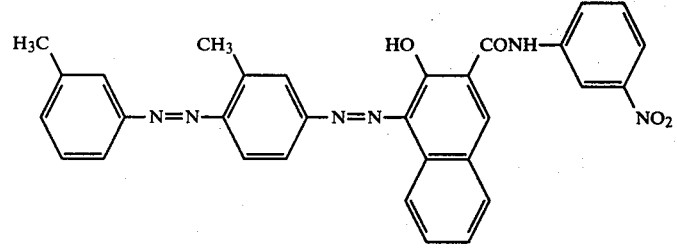

TABLE 1-continued

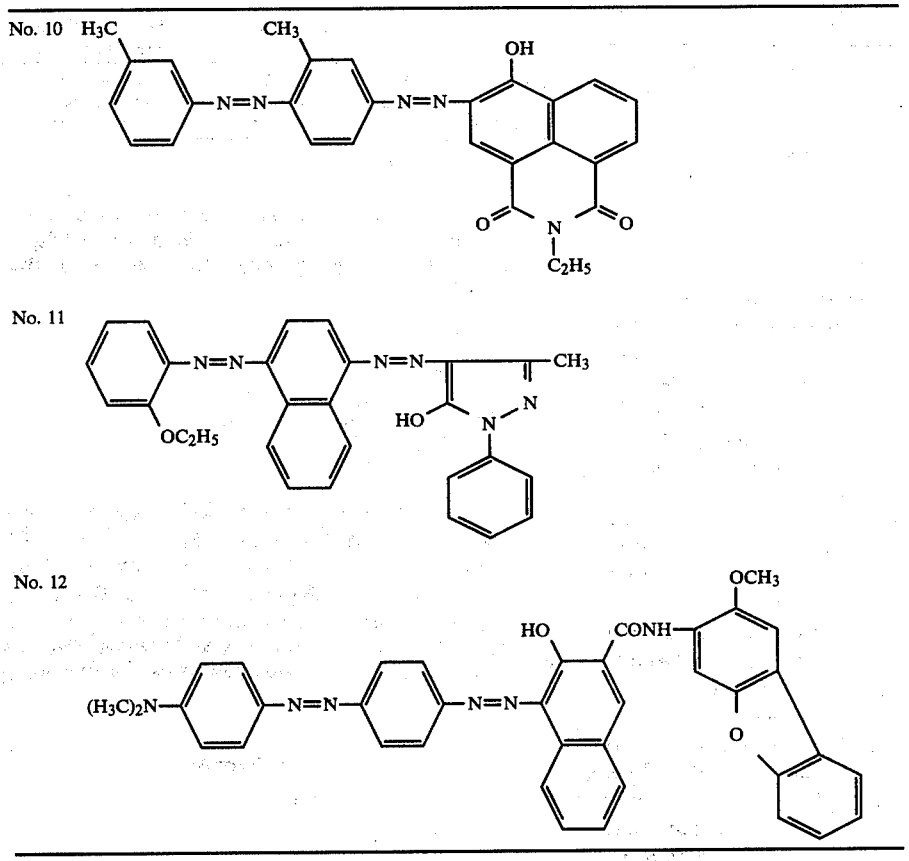

EXAMPLE 1

In a ball mill, 1 part by weight (hereinafter referred to as "part") of the disazo pigment No. 1 prepared in the Synthesis Example, 5 parts of p-diethylaminobenzaldehydo-(diphenylhydrazone), 10 parts of a polyester resin (Vylon 200 supplied by Toyobo) and 100 parts of tetrahydrofuran (hereinafter referred to as "THF") were dispersed and mixed for 5 hours, and the resulting dispersion was coated on an aluminum foil having a thickness of 50μ by a wire bar and dried at 80° C. for 1 hour to obtain an electrophotographic photosensitive material comprising a photosensitive layer having a thickness of about 10μ.

The surface of the photosensitive material was subjected to positive or negative corona charging at 6 KV and the voltage of the surface was measured as the initial voltage Vo by using a surface potentiometer (Model SP-428 supplied by Kawaguchi Denki). Then, the surface of the sample was irradiated at an illuminance of 20 luxes and the half-value time t required for the surface voltage to be reduced to ½ of the initial voltage Vo was measured. The half-value exposure quantity (E½, unit=lux.sec) calculated by multiplying the illuminance by the half-value time t was used as the criterion for determining the photosensitivity. It was found that in case of positive charging, the initial voltage Vo was +340 V and the half-value exposure quantity E½ of the photosensitive material was 13 lux.sec, and that in case of negative charging, the initial voltage Vo and −450 V and the half-value exposure quantity was 19 lux.sec.

The spectral sensitivity of this photosensitive material was measured in the following manner.

A surface voltage of about +350 V was applied by corona discharge to the surface of the photosensitive material which had been allowed to stand in the dark place, and the surface of the sample was exposed to a constant-energy monochromatic light so that the light-receiving intensity on the surface of the sample was 5.7 μw/cm². The time T (half-value exposure time) required for the surface voltage to be reduced to ½ was measured with respect to each wavelength. Reciprocal numbers of the values T for the respective wavelengths were plotted to determine the spectral sensitivity. The spectral sensitivity of the photosensitive material obtained in this Example is shown in FIG. 1. From FIG. 1, it is seen that the spectral sensitivity of this photosensitive material is in the wavelength region of from 400 to 800 nm and the λmax value is 630 nm. Accordingly, it was confirmed that this photosensitive material is valuable not only as an ordinary electrophotographic photosensitive material but also as a photosensitive material for an He-Ne laser printer (oscillation wavelength=632.8 nm).

EXAMPLES 2 THROUGH 4

Photosensitive materials were prepared and tested in the same manner as described in Example 1 except that disazo pigments Nos. 2 through 4 shown in Table 1 were used instead of the disazo pigment No. 1. The obtained results are shown in Table 2.

TABLE 2

| Example No. | Pigment No. | Vo (v) | E½ (lux · sec) |
|---|---|---|---|
| 2 | 2 | +275 | 12 |
|   | 2 | −372 | 14 |
| 3 | 3 | +260 | 9 |
|   | 3 | −370 | 13 |
| 4 | 4 | +255 | 11 |
|   | 4 | −415 | 21 |

EXAMPLE 5

In a ball mill, 5 parts of the disazo pigment No. 5 shown in Table 1, 15 parts of a polyester resin and 150 parts of THF were dispersed and mixed for 5 hours, and the dispersion was coated on an aluminum foil having a thickness of 50μ by a wire bar and was dried at 100° C. for 30 minutes to form an electrophotographic photosensitive material comprising a photosensitive layer having a thickness of about 10μ.

The photosensitive material was stored in the dark place, and then, the photosensitive material was charged by positive corona discharge and was exposed to light in the state closely adhering to a positive original (a transparent film having an image formed thereon) so that the illuminance of the surface of the photosensitive material was 80 luxes. Then, development was carried out by using a negative two-component type developer (developer for a copying machine DC-161 supplied by Mita Industrial Company Limited), and the developer image was transferred onto a plain paper (bond paper having a thickness of about 90μ) and was heat-fixed. A copy faithful to the original, which had a high contrast with no fogging, was obtained.

EXAMPLES 6 THROUGH 8

Photosensitive materials were prepared and tested in the same manner as described in Example 5 except that disazo pigments Nos. 6 through 8 were used instead of the disazo pigment No. 5. In each case, a copy faithful to the original was obtained without fogging.

EXAMPLE 9

In a ball mill, a part of disazo pigment No. 9 shown in Table 1 and 20 parts of THF were dispersed and mixed for 5 hours, and the dispersion was coated on an aluminum foil having a thickness of 50μ by a wire bar and dried at 100° C. for 30 minutes to form a charge-generating layer having a thickness of 1μ. Then, a mixed solution comprising 5 parts of p-diethylaminobenzaldehydo-(diphenylhydrazone), 5 parts of a polyester resin and 50 parts of THF was coated on the charge-generating layer and dried at 80° C. for 1 hour to form a charge-transporting layer having a thickness of about 10μ. The electrophotographic characteristics of this laminated photosensitive material were such that the initial voltage Vo was −640 V and the half-value exposure quantity E½ was 8.3 lux.sec.

EXAMPLES 10 THROUGH 12

Photosensitive materials were prepared and tested in the same manner as described in Example 9 except that disazo pigments Nos. 10 through 12 shown in Table 1 were used instead of the disazo pigment No. 9. The obtained results are shown in Table 3.

TABLE 3

| Example No. | Pigment No. | Initial Voltage Vo | Half-Value Exposure Quantity E½ |
|---|---|---|---|
| 10 | 10 | −570 V | 11.2 lux · sec |
| 11 | 11 | −630 V | 12.5 lux · sec |
| 12 | 12 | −615 V | 15.8 lux · sec |

What is claimed is:

1. A photosensitive material for electrophotography, which comprises a photosensitive layer containing a photoconductive disazo pigment represented by the following formula:

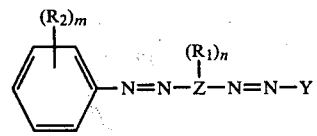

wherein $R_1$ stands for a lower alkyl group or a lower alkoxy group, n is a number of zero, 1 or 2, $R_2$ stands for a lower alkyl group, a lower alkoxy group, a di-lower-alkylamino group, a nitro group or a halogen atom, m is a number of zero, 1 or 2, Z stands for a benzene ring or a naphthalene ring, and Y stands for a group represented by the following formula:

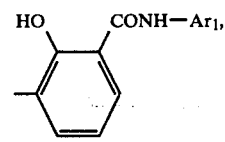

in which B stands for a benzene, naphthalene, indole, carbazole or banzofuran ring or a substitution product thereof, which is fused to the benzene ring, and $Ar_1$ stands for a benzene ring, a naphthalene ring, a dibenzofuran ring or a substitution product thereof.

2. A photosensitive material as set forth in claim 1, wherein the photosensitive layer is composed of a dispersion of the disazo pigment in an electrically insulating binder medium.

3. A photosensitive material as set forth in claim 2, wherein the disazo pigment is present in an amount of 5 to 100 parts by weight per 100 parts by weight of the binder.

4. A photosensitive material as set forth in claim 1, wherein the photosensitive layer is composed of a dispersion of the disazo pigment as a charge-generating pigment in a charge-transporting substance.

5. A photosensitive material as set forth in claim 4, wherein the disazo pigment is present in an amount of 1 to 30 parts by weight per 100 parts by weight of the entire photosensitive layer.

6. A photosensitive material as set forth in claim 1, wherein the photosensitive layer comprises a charge-generating layer containing the disazo pigment, which is formed on an electroconductive substrate, and a layer of a charge-transporting substance formed on the charge-generating layer.

7. A photosensitive material as set forth in claim 6, wherein the charge-generating layer has a thickness of 0.1 to 3 microns and the charge-transporting layer has a thickness of 5 to 30 microns.
8. A photosensitive material as set forth in claim 1 wherein the disazo pigment is selected from the group consisting of
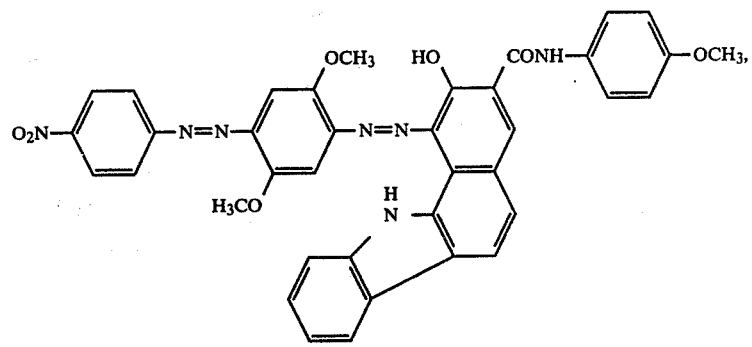
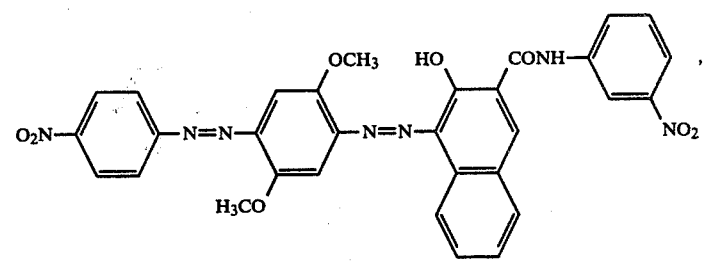
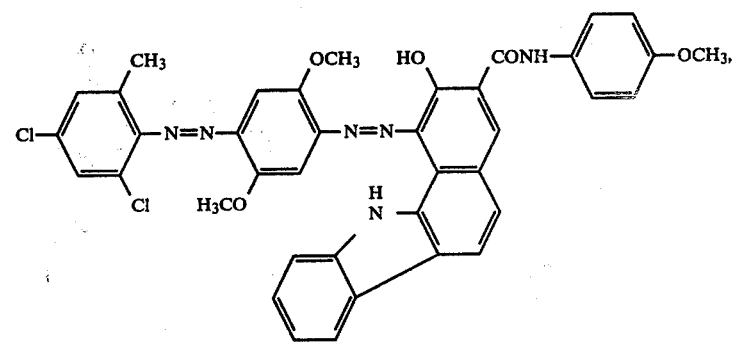
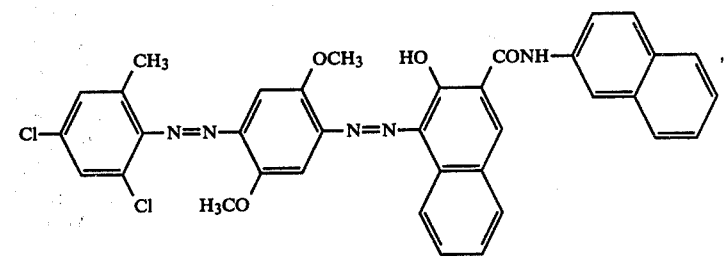
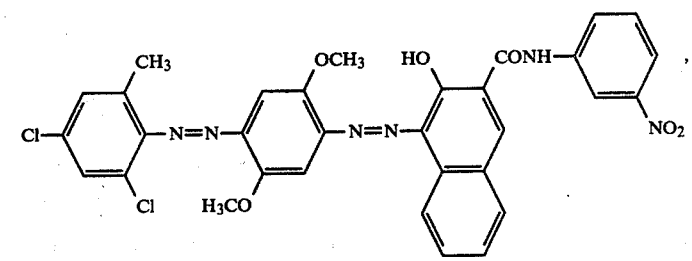

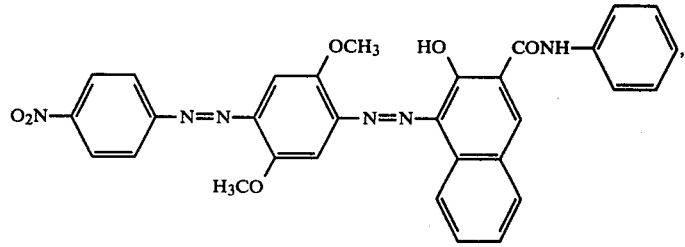

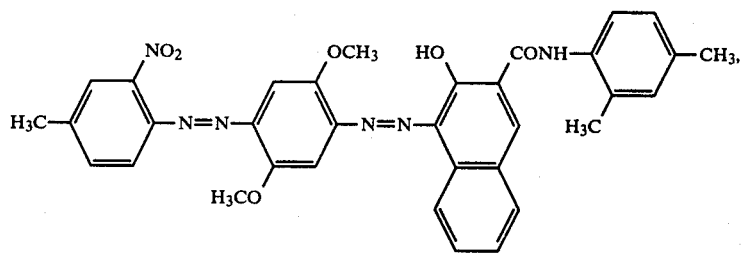

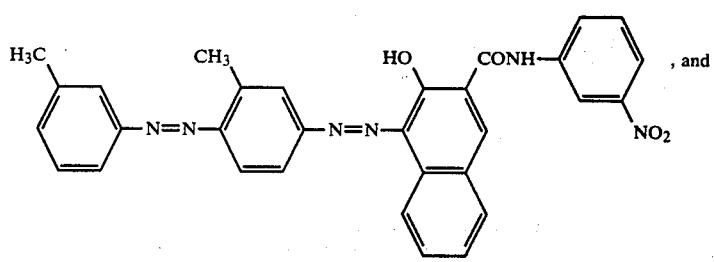

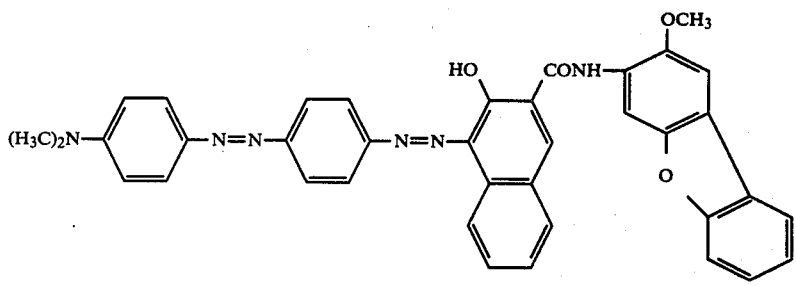

9. A photosensitive material for electrophotography, which comprises a photosensitive layer containing a photoconductive disazo pigment represented by the following formula:

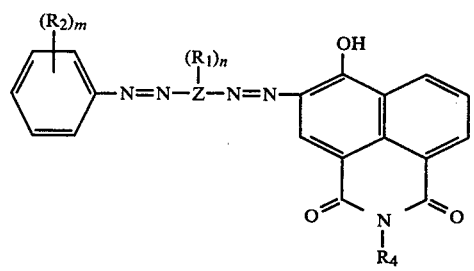

wherein $R_1$ stands for a lower alkyl group or a lower alkoxy group, n is a number of zero, 1 or 2, $R_2$ stands for a lower alkyl group, a lower alkoxy group, a di-lower-alkylamino group, a nitro group or a halogen atom, m is a number of zero, 1 or 2, Z stands for a benzene ring or a naphthalene ring, and $R_4$ stands for a hydrogen atom, a lower alkyl group, a phenyl group or a substituted phenyl group.

10. A photosensitive material as set forth in claim 9, wherein the photosensitive layer is composed of a dispersion of the disazo pigment in an electrically insulating binder medium.

11. A photosensitive material as set forth in claim 10, wherein the disazo pigment is present in an amount of 5 to 100 parts by weight per 100 parts by weight of the binder.

12. A photosensitive material as set forth in claim 9, wherein the photosensitive layer is composed of a dispersion of the disazo pigment as a charge-generating pigment in a charge-transporting substance.

13. A photosensitive material as set forth in claim 12, wherein the disazo pigment is present in an amount of 1 to 30 parts by weight per 100 parts by weight of the entire photosensitive layer.

14. A photosensitive material as set forth in claim 9, wherein the photosensitive layer comprises a charge-generating layer containing the disazo pigment, which is formed on an electroconductive substrate, and a layer of a charge-transporting substance formed on the charge-generating layer.

15. A photosensitive material as set forth in claim 14, wherein the charge-generating layer has a thickness of 0.1 to 3 microns and the charge-transporting layer has a thickness of 5 to 30 microns.

16. A photosensitive material as set forth in claim 9, wherein the disazo pigment is selected from the group consisting of

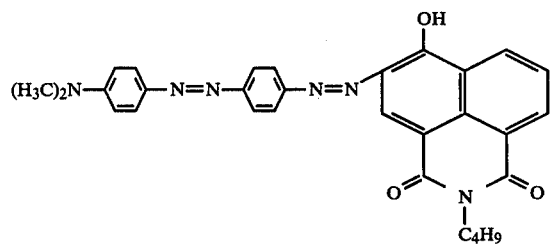

and

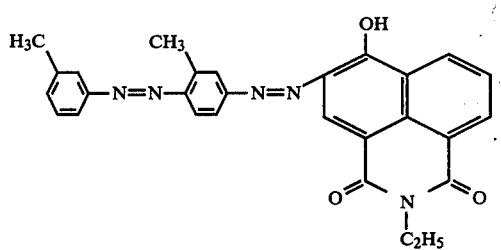

17. A photosensitive material for electrophotography, which comprises a photosensitive layer containing a photoconductive disazo pigment represented by the following formula:

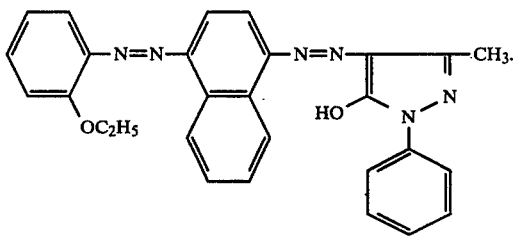

18. A photosensitive material as set forth in claim 17, wherein the photosensitive layer is composed of a dispersion of the disazo pigment in an electrically insulating binder medium.

19. A photosensitive material as set forth in claim 18, wherein the disazo pigment is present in an amount of 5 to 100 parts by weight per 100 parts by weight of the binder.

20. A photosensitive material as set forth in claim 17, wherein the photosensitive layer is composed of a dispersion of the disazo pigment as a charge-generating pigment in a charge-transporting substance.

21. A photosensitive material as set forth in claim 20, wherein the disazo pigment is present in an amount of 1 to 30 parts by weight per 100 parts by weight of the entire photosensitive layer.

22. A photosensitive material as set forth in claim 17, wherein the photosensitive layer comprises a charge-generating layer containing the disazo pigment, which is formed on an electroconductive substrate, and a layer of a charge-transporting substance formed on the charge-generating layer.

23. A photosensitive material as set forth in claim 22, wherein the charge-generating layer has a thickness of 0.1 to 3 microns and the charge-transporting layer has a thickness of 5 to 30 microns.

* * * * *

UNITED STATES PATENT AND TRADEMARK OFFICE
CERTIFICATE OF CORRECTION

PATENT NO. : 4,480,019

DATED : October 30, 1984

INVENTOR(S) : HIGASHIGUCHI, ET AL.

It is certified that error appears in the above-identified patent and that said Letters Patent is hereby corrected as shown below:

Claim 1, (column 16, line 35), delete the second formula and insert therefor

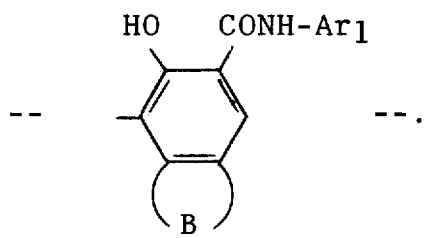

Signed and Sealed this

Twenty-eighth Day of May 1985

[SEAL]

Attest:

DONALD J. QUIGG

Attesting Officer     Acting Commissioner of Patents and Trademarks